March 19, 1935.                W. W. LASKER                1,994,655
                            RENUMBERING MACHINE
                            Filed Dec. 31, 1931        6 Sheets-Sheet 4
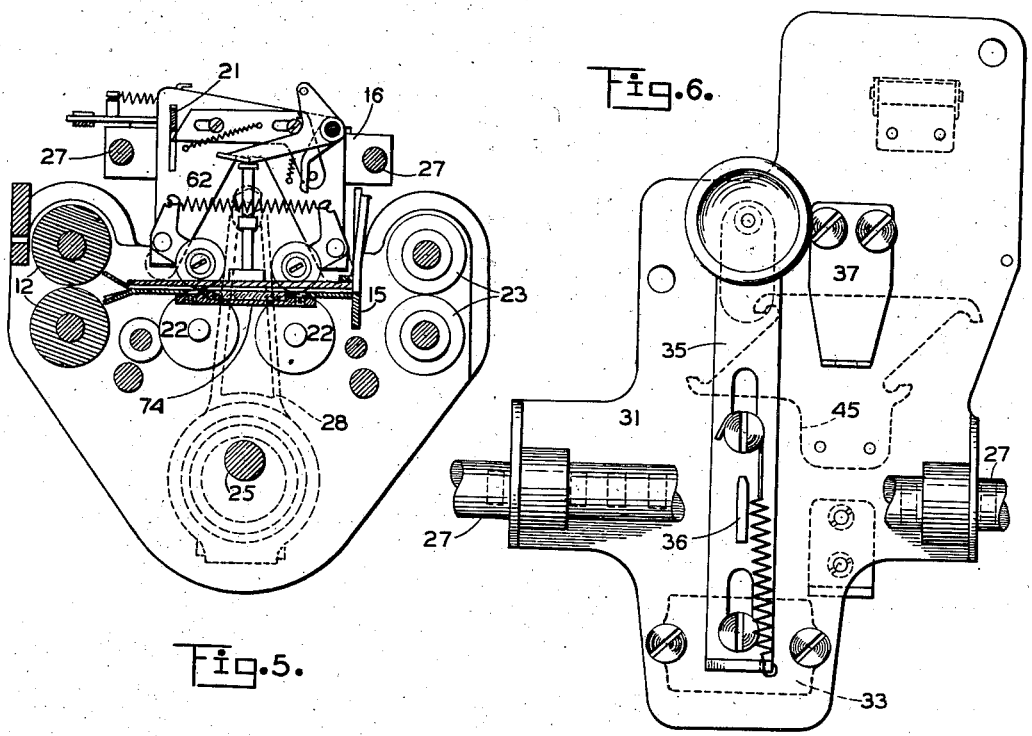
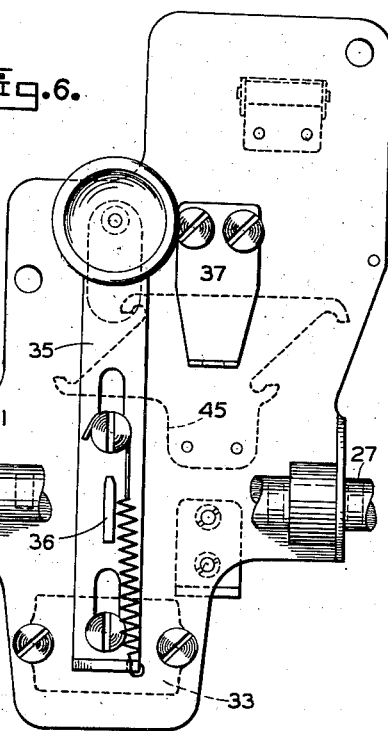
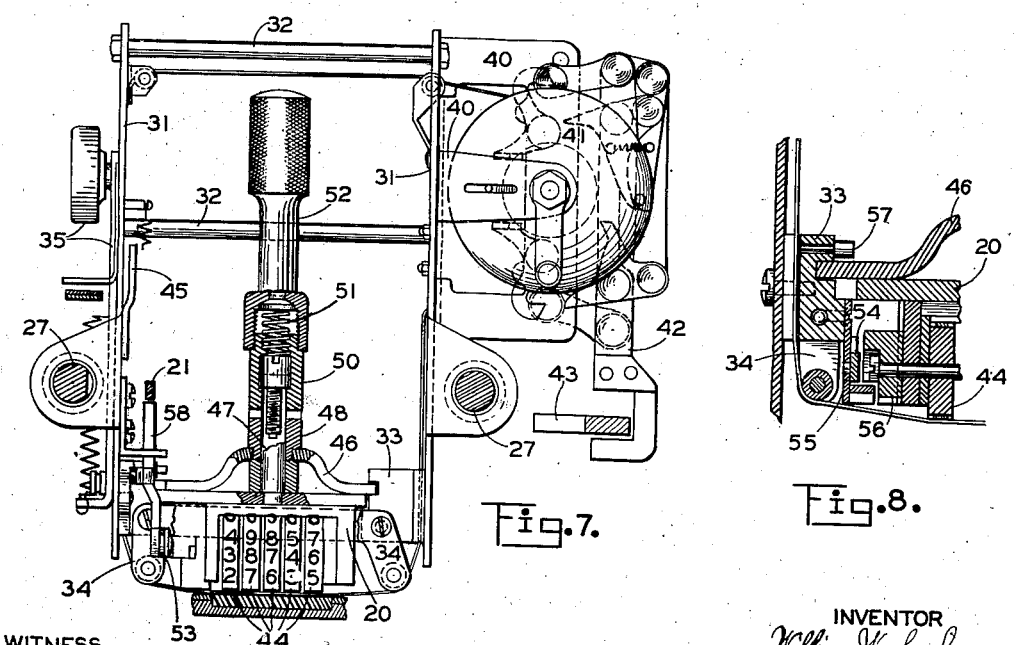
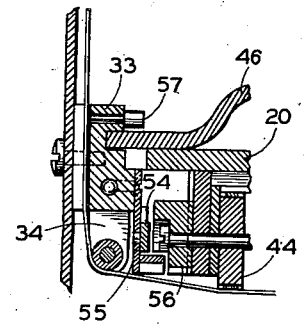
WITNESS
INVENTOR
William W. Lasker
BY Robert H. Strother
ATTORNEY March 19, 1935.  W. W. LASKER  1,994,655
RENUMBERING MACHINE
Filed Dec. 31, 1931  6 Sheets-Sheet 5

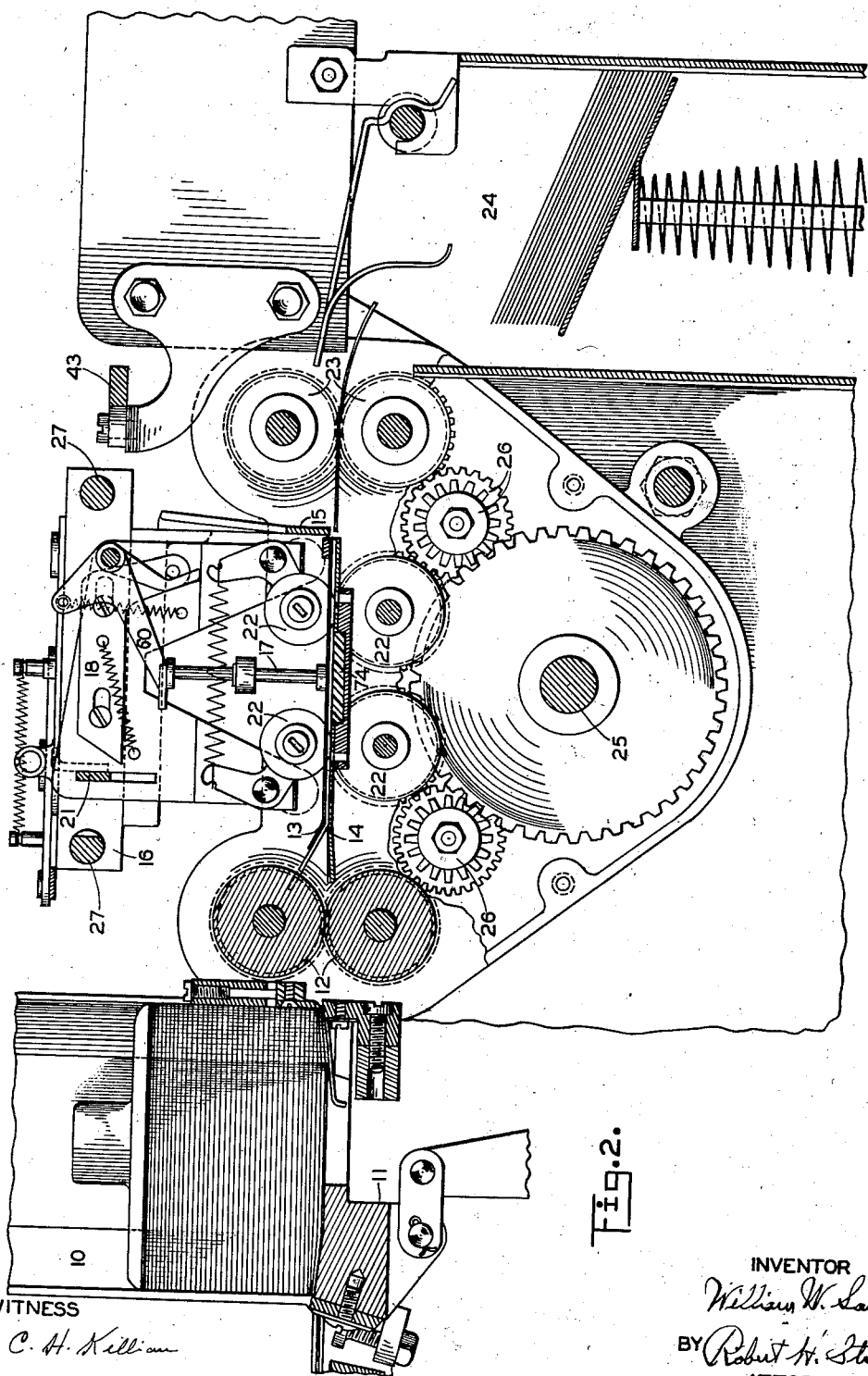

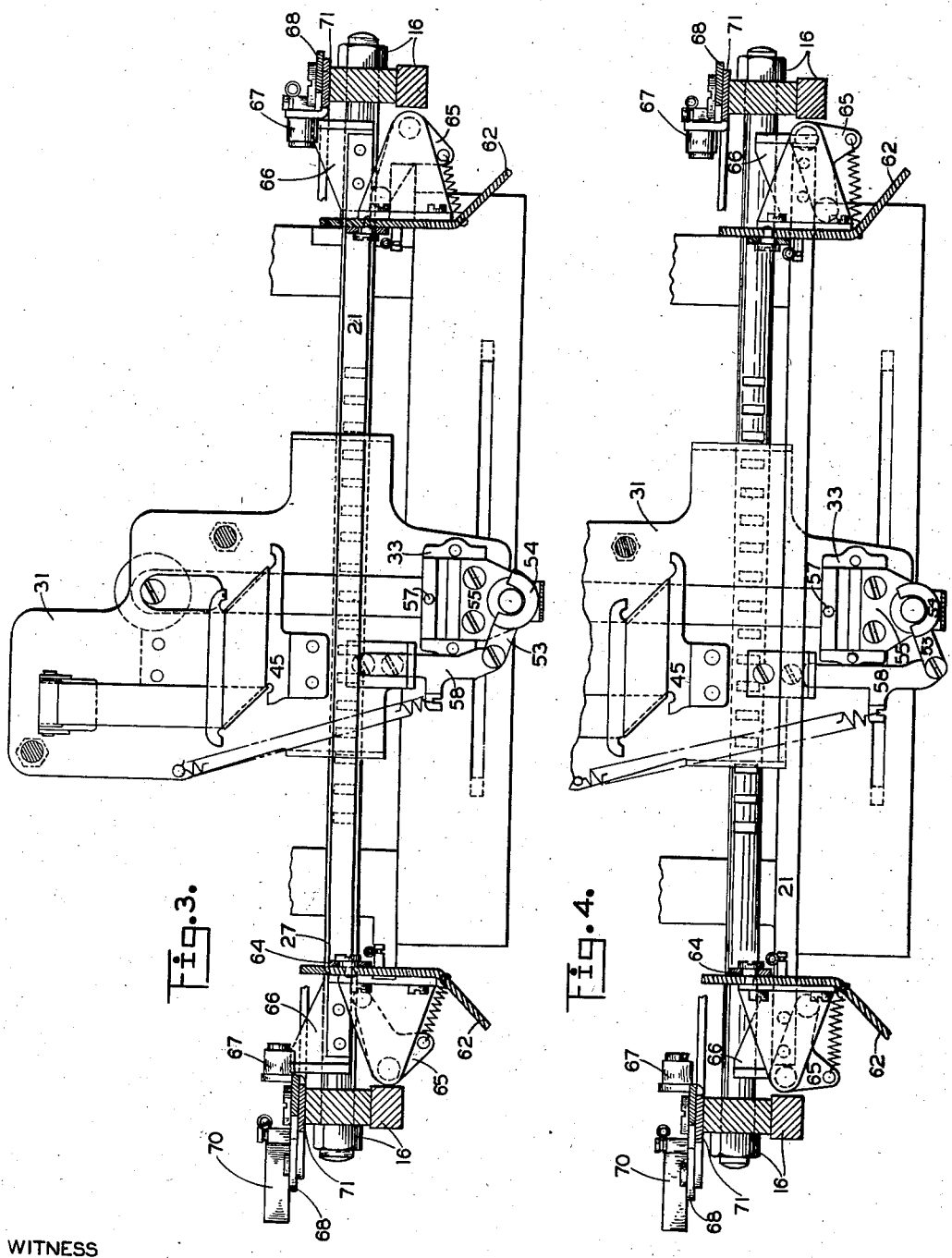

WITNESS
C. H. Killian

INVENTOR
William W. Lasker
BY Robert H. Strothers
ATTORNEY

March 19, 1935.　　　　　W. W. LASKER　　　　　1,994,655
RENUMBERING MACHINE
Filed Dec. 31, 1931　　　6 Sheets-Sheet 6
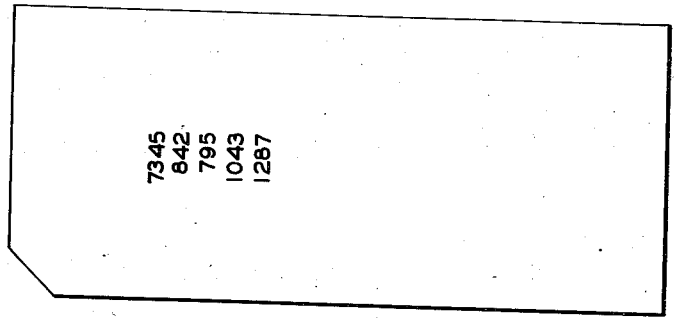
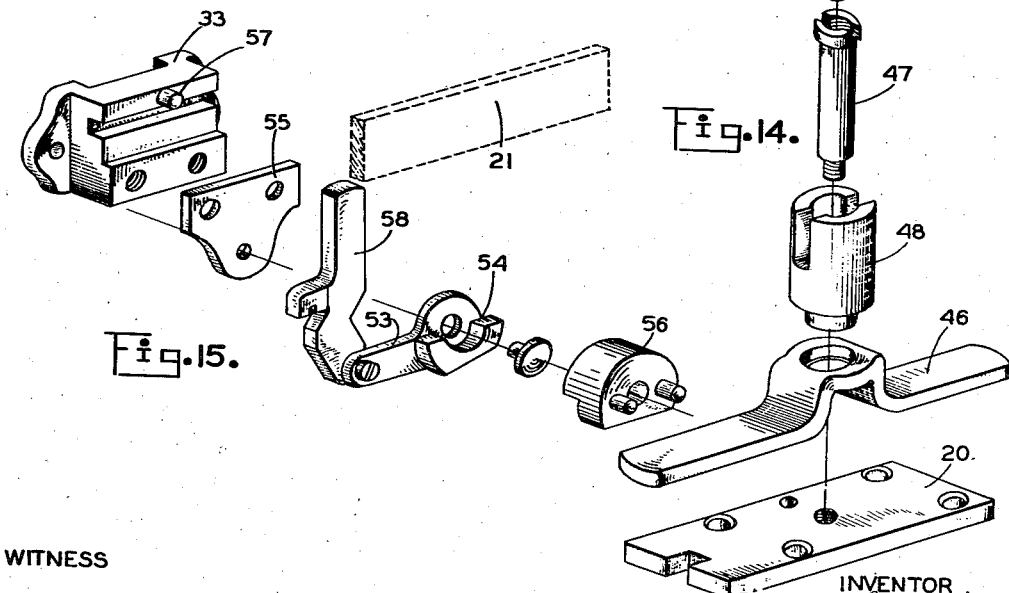
WITNESS
C. H. Killian
INVENTOR
William W. Lasker
Robert Hutton
ATTORNEY Patented Mar. 19, 1935

1,994,655

UNITED STATES PATENT OFFICE 1,994,655

RENUMBERING MACHINE

William W. Lasker, Brooklyn, N. Y., assignor to Remington Rand Inc., New York, N. Y., a corporation of Delaware Application December 31, 1931, Serial No. 584,035

9 Claims. (Cl. 101—78)

The present invention relates to numbering devices and especially to such devices adapted for use with accounting machine systems.

When a common system of accounting is employed, a card is perforated for each unit of goods held in a warehouse, and the cards relating to such merchandise classification consecutively numbered. Upon the arrival of additional goods of the same class, additional cards are made, the serial numbers commencing with the next higher number to that already in the file.

To clarify this by illustrative example, let us assume that a chain store warehouse has 500 cases of peaches in stock, each case being considered a unit. Then these cases would be represented by five hundred consecutively numbered cards. If the management now found it necessary to purchase an additional 200 cases of peaches, 200 additional cards would be perforated, these cards bearing serial numbers from 501 through 700.

Using the accounting system mentioned, as orders are sent to the central office, a clerk takes from the file a card representing each unit shown on the order. These cards are then run through a tabulator, which produces a store invoice representing the commodity, description, retail price and cost, (it being understood that these items are included when the card is made). A copy of the bill, made out on the tabulator, is sent to the warehouse, from which the stock is selected, and, when the shipment is made, the invoice is sent or delivered with the goods.

The cards, which are used to prepare the invoice, may be used to make daily or periodical sales analyses in accordance with commodity classification, or according to purchasers (or branch stores, if chain store systems be considered).

Common practice has been to use each card but once, destroying it after the invoice and sales analysis are prepared. These cards represent a considerable expense and their destruction is a consequent waste. Some large chain systems, for example, use tens of millions of cards each year.

As long as the price of a given commodity remains the same, the cards can be re-used by simply sorting them back to the proper commodity classification. But, when this is done, it is necessary to re-number them, as the numbers play a very important part in keeping a perpetual inventory of goods in the warehouse.

It is obvious that the difference between the first and last numbers on the cards representative of any commodity is the number of units of that commodity in stock.

With the machine described in this specification, it is possible to print a new consecutive number in a different location when the cards are re-used.

Of course, the system may require the use of a certain amount of clerical effort and possibly require also a regular sorting machine to sort the cards into their proper classification. Even so, there is a material net saving to a concern using a large number of cards.

I will now proceed to describe the preferred form of my invention as disclosed in the drawings herein.

Fig. 2 is an elevation of the principal elements of the driving mechanism.

Fig. 3 is a front view with the mechanism set for consecutive numbering.

Fig. 4 is a view similar to Fig. 3 with the parts in an advanced position.

Fig. 5 is a detail of the sensing mechanism.

Fig. 6 is a detail of the adjustable numbering carriage.

Fig. 7 is an end view of the numbering carriage with certain parts in section.

Fig. 8 is a detail of the inking ribbon path.

Fig. 12 is a view of a conventional card which has been extensively used in the system described herein.

Fig. 13 is a card which has been numbered on its back each time that it was passed through the machine.

Fig. 14 is an exploded isometric view of the details of construction of the numbering head and its operating elements.

Fig. 15 is an exploded isometric view of the mechanism for operating the numbering head.

Figure 1:
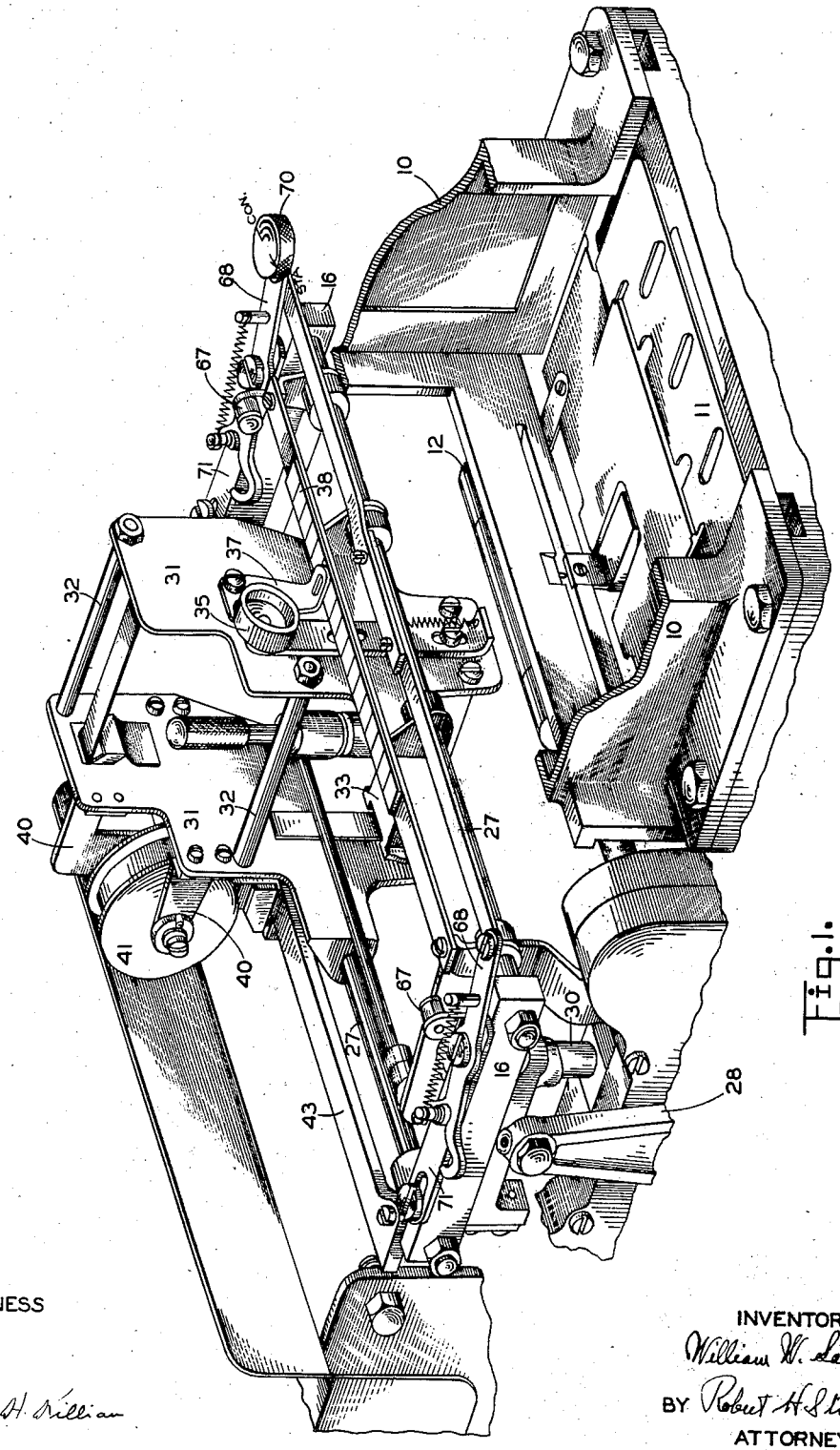
Fig. 1 is an isometric view of the principal operating parts of the reciprocating numbering mechanism.

Referring to the drawings, the cards to be numbered (or renumbered) are stacked and weighted in the magazine 10. The cards are fed, one at a time, from the bottom of the stack by a suitably located, power driven, harmonically operated picker 11 through a knife adjusted throat to the pair of power driven feed rolls 12. Thence they pass between a pair of matched multilated plates 13—14 where each one is temporarily arrested by the interposed card stop 15. The said card stop is mounted on the harmonically moving, power driven, cross head 16. Shortly after the card contacts with the card stop 15, the sensing plunger 17 descends sufficiently to detect the presence of the card. The plunger 17 controls the setting of a slide 18 to prevent the actuation of a numbering head 20 (Figs. 3, 4 and 7) when no card is present in the box. This is accomplished by temporarily locking a floating universal bar 21. When, due to an interposed card, the sensing plunger 17 fails to pass through the perforation in the lower plate 14, it rises relative to the cross head 16 to lock the floating bar 21 in a relatively lower position to effect consecutive numbering. A manually controlled lock-out for the actuating member of the numbering head is also provided. After printing occurs the cross head 16 rises and the dual pair of feeding rolls 22 carry the card to the pair of ejecting rolls 23 and thence to the storage magazine 24.

Main drive

The connections for operating the elements briefly described consists of a main manual and power rotatable shaft 25 to which is fixed a large spur gear which is permanently meshed with a pair of idlers 26, which in turn are meshed with spur gears fixed to the lower of the feed rolls 12, the lower of the forward numbering box feed disks 22; and a corresponding drive mechanism at the eject end of the machine for the rearward numbering box disks 22 and lower eject rolls 23. The pairs of rolls 12 and 23 are permanently geared together as is indicated by the tangent pitch circles. The upper pairs of numbering chamber disks 22 are mounted on bell cranks which are resiliently urged downwardly by suitably located springs so as to have a frictional engagement with the lower disks 22 or with an interposed card. The disks 22 occur in pairs on each side of the machine where they contact with the edges of a card in a well known manner. The picker 11 is driven by an arm fixed to a cross shaft which in turn is oscillated by an arm, connecting link and an eccentric mounted on the main shaft 25. The cross head 16 consists of a pair of frames 16, one at each side of the machine, rigidly connected together by a pair of comparatively heavy cross rods 27. One of the cross rods 27 is notched for indexing, or locating the carriage which carries the numbering head 20. Each end frame 16 is connected by a connecting link 28 to an eccentric on the main shaft 25. Each cross-head frame 16 is provided with a comparatively long integral sleeve through which extends a post 30 (Fig. 1) fixed to the main frame work of the machine. The mechanism briefly described in this paragraph is illustrated in part only for it constitutes merely the setting or frame for the invention to be described. This mechanism is similar to that illustrated and described fully in numerous patents, see for example:—

Powers 1,177,651 granted Apr. 4, 1916, Lasker 1,315,570 granted Sept. 9, 1919, Lasker 1,476,161 granted Dec. 4, 1923, and Still 1,514,110 granted Nov. 4, 1924.

Numbering machine sub-carriage

It is desirable to print numbers in differing columns on the card for differing runs of the cards through the machine. The numbering device 20 is mounted in a sub-carriage comprising a pair of side plates 31 which are connected by suitably located squaring rods 32 and by a frame at their lower ends the frame comprising a pair of blocks 33 joined by guide plates 34. Each plate 31 is provided with a pair of turned over pierced lugs for supporting the whole assembly for transverse adjustment upon the parallel cross-rods 27.

Slidably mounted on the front side of one of the plates 31 is a manually operable spring pressed latch 35 which is provided with a tongue 36 to engage a selected notch on the bar 27. Near the latch 35 is an index or pointer 37 for cooperation with a scale 38 which is carried by a pair of feet rigidly fixed to the notched cross rod 27 best shown in Fig. 1.

Mounted on the rear side plate 31 is a series of brackets 40 for supporting a pair of ink ribbon spools 41 and their feeding and automatic reversing mechanism. Mounted on the ends of a pair of spring urged parallel arms is a hook shaped ribbon feed pawl actuating member 42 which embraces a fixed bar 43, so that oscillations of the cross head bars 27 cause a predetermined extent of shifting of the hook 42 to effect feeding of the ribbon. The ribbon is threaded from one of the spools 41 through an opening in the rear side plate 31, thence downwardly through a rabbet in the block 33 (Figs. 1 and 8), thence under a roll supported by downward extensions on the pair of guide plates 34, thence under the type of the printing wheels 44 (Figs. 7 and 8), thence under a second roll supported by front downward extensions on the guide bars 34, thence upwardly through a rabbet in the forward block 33 and parallel to the inner side of the front side plate 31 and through an aperture therein, thence over a guide 45 for laterally displacing the ribbon (Figs. 3, 4 and 6), and thence to the other of the spools 41. The ribbon feeding and reversing mechanism may be of any desired or well known form so that it need not be further described.

Numbering head

The numbering head is constructed so as to be readily inserted into the sub-carriage and equally readily detached therefrom. The numbering mechanism itself may have any convenient form such as for example, the American Numbering Head (the particular example illustrated is identified as model 30). The connecting mechanism may have a variety of forms, but a convenient one is that of a circular form of spring lock. Rotatably mounted on a spindle or headed post 47 on the head plate 20 of the numbering head is a latch member 46 (Figs. 7, 8 and 14) which is rigid with its crenelated sleeve 48. The head of the post 47 is grooved to correspond with the crenelations of the sleeve 48. The collar 50 is provided with a pair of tines with enlarged ends. The tines of the collar fit loosely and slidably into the crenelations of the sleeve 48 so that said collar may be readily forced downwardly against the tension of the spring 51 to release the enlarged ends of the tines from the grooves in the head of the post 47 which are normally engaged thereby. Fixed to the top of the collar 50 in any suitable manner, such as by a threaded joint, is a finger piece 52. When the numbering head is in its proper position in the subcarriage 31 the body of the numbering head is located between the bars 34 and the blocks 33 and lock member 46 engages open grooves in the blocks 33. The whole assembly is locked in this position by the engagement of the tines of collar 50 with the crenelations of sleeve 48 and the broadened ends of the said tines are locked in the grooves in the head of fixed post 47. All parts are locked in this position by the compression spring 51. When it is desired to remove the counting head assembly the finger piece 52 is forced downwardly by pressure thus disengaging the enlarged part of the tines from the grooves in the head of the post 47. Then the finger piece 52 is rotated carrying with it the sleeve 48, through the engagement of the tines of collar 50 with the crenelations of the said sleeve, thus disengaging latch 46 from the grooves of the blocks 33. The entire assembly can then be lifted out of the sub-carriage 31.

*Actuating the numbering head*

The printing wheels of the numbering head are operated by an automatic oscillation of the lever 53. In order to provide for ready removal of the numbering head the driving connection must be split. The lever 53 is fixed to a disk 54 as shown in Fig. 15 and the latter is attached by a trunnion rivet to a plate 55 fastened rigidly with one of the blocks 33. Fixed to the actuating shaft of the numbering wheel 44 is an ungulate collar 56. The construction and arrangement is such that when the counting head is in its proper position the cut away portion of the ungulate collar 56 is approximately filled by the upper edge of that portion of lever 53 which coincides with a diameter of the washer 54. It is apparent that the described construction forms a simple mode for driving the numbering wheels for a readily removable numbering head irrespective of the position of the actuating lever 53.

In order to guard against any attempt to insert the numbering head in the wrong direction one of the blocks 33 is provided with a fixed pin 57 which can pass through a companion notch in the numbering head block 20 as is shown best in Fig. 15.

Pivotally mounted on the end of the lever 53 and guided by a pierced bracket on the side plate 31 is a plunger 58 which is relatively depressed to actuate the lever 53 and hence the wheels of the numbering head. Relative motion is transmitted to the plunger by a floating universal bar 21.

*Card presence control of numbering*

The operation of the consecutive numbering head is dependent upon the presence or absence of a card in the numbering chamber. The sensing pin, or plunger 17 is guided in suitably located bosses and is pressed downwardly by a spring urged bell crank 60. The sensing pin 17 is carried by lugs extending from the casting of the reciprocating cross head 16 as is fully illustrated and described in the patents cited above; and the spring urged bell crank 60 is fast to a shaft 61 pivoted at its ends in the off set gallows frames 62. It is thus seen that the spring which urges the pin or plunger 17 downwardly is relocated herein as compared to the prior use. Fixed near each end of the spring urged shaft 61 is an arm 63 which cooperates with a pin rigid with a corresponding spring urged slide 64 slidably supported on screw studs on each of the gallows frames 62. The floating universal bar 21, which overlies the plunger 58, is adjustably carried by the reciprocating cross head 16 and is urged towards its upper position by a pair of spring urged bell cranks 65 (Figs. 3 and 4) and is guided in its up and down motion by a rectangular slot in each of the gallows frames 62. When a card is in the numbering chamber and the cross head 16 is travelling downwardly the spring urged slides 64 are in the positions shown in Fig. 10, the universal bar 21 is forced past the spring urged slides 64 and is locked by the latter into the position shown in said figure. When the cross head 16 starts upwardly the universal bar 21 is held in its lower position but the numbering head is positively carried upwardly, hence the plunger 58 (see Fig. 4) is forced downwardly relative to the frames 31, thus actuating the printing counter 20. If no card is present in the numbering chamber the pin or plunger 17 follows the crosshead 16 downwardly and the slides 64 are held retracted as in Fig. 11, hence the floating universal bar 21 follows the crosshead 16 and the numbering counter 20 is not actuated. It therefore follows that the printing numbering head is actuated when and only when there is a card in the sensing chamber to receive an imprint.

*Stamping or numbering*

Figure 9:
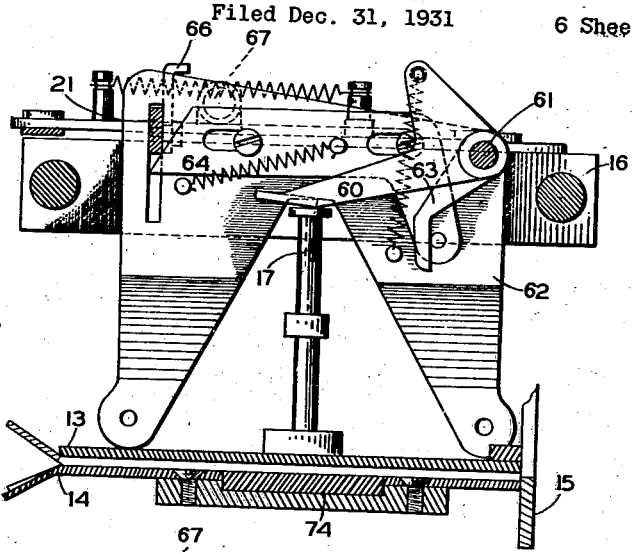
Fig. 9 is a view of the normal position of the sensing mechanism control of the counter actuating bar at one end of the reciprocating cross head.
Figure 10:
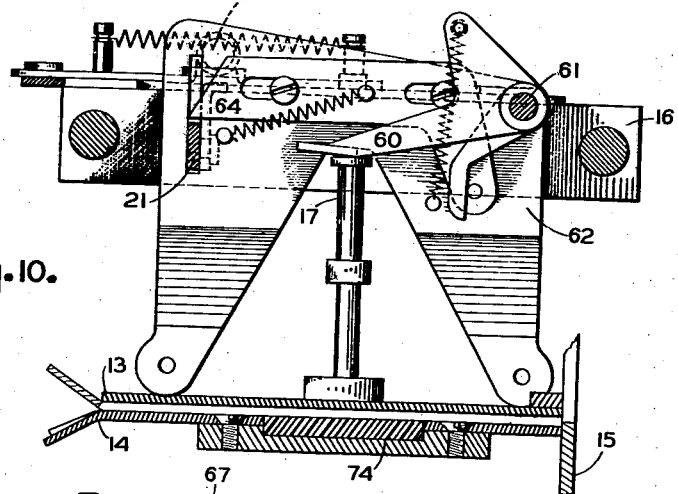
Fig. 10 is a view similar to Fig. 9 with the parts in an advanced position.
Figure 11:
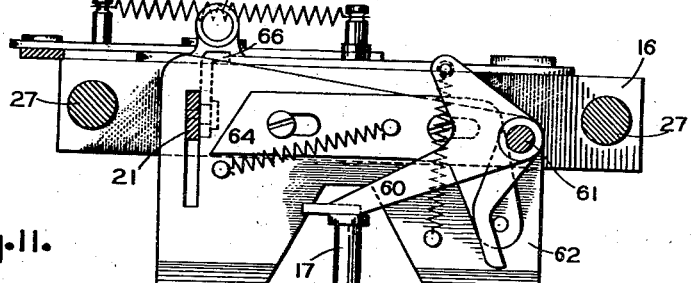
Fig. 11 is a view similar to Fig. 10 with the parts in a further advanced position.

At times it may be desirable to merely stamp some arbitrary number on the cards instead of numbering them consecutively. This object may be attained by permitting the floating universal bar 21 to remain in the position shown in Fig. 9 irrespective of the position of the reciprocating crosshead 16. The said bar 21 is provided with ears 66 at each end which may have the roller lugs 67, carried by slides on the crosshead 16, interposed above said ears as shown in Figs. 10 and 11; or the said roller lugs 67 may be shifted laterally to ineffective position as shown in Fig. 9. The described positions of the lugs 67 correspond to the conditions of consecutive numbering or merely stamping respectively. Manipulative means 68, in the form of a pair of link connected levers is used for positioning the lugs 67 into stamping or numbering position. One of said levers 68 is provided with a finger piece 70 and the rearward end of each lever is provided with a two level cam for shifting an associated slide 71 for positioning the corresponding lug 67 carried thereby. The levers 68 and slides 71 are resiliently held in either of the two described positions by an over-the-center spring connecting pins on each as shown in Fig. 1.

What I claim as new and desire to secure by Letters Patent is:

1. In a machine of the class described, the combination of a device having a reciprocable printing device for separately acting upon each card of a series of cards for printing indicia in any one of a plurality of predeterminable positions to indicate certain information, means for adjusting the printing location to indicate other information, means for causing the printing device to consecutively number the cards as printed indicia and means controlled by a card including a sensing element for governing the action of the consecutive printing means irrespective of the printing position.

2. In a machine of the class described, the combination of a reciprocable consecutive numbering printing head, means for feeding cards seriatim to positions to receive an imprint from said head in any one of a plurality of predetermined locations, a card detecting device for controlling the operation of said printing head, a universal floating bar connected thereto and a pair of latches controlled by said detecting device cooperating with said bar.

3. In a machine of the class described, the combination of a reciprocable consecutive numbering printing head, means for feeding cards seriatim to printing position, means for printing consecutive numbers on said cards in any one of a plurality of predetermined positions to indicate certain information, means to adjust the printing point to indicate still other information, and means including a latch device controlled by a card in printing position for controlling said numbering head, said latch device functioning to control the operation of said consecutive numbering head when a card is in printing position and failing to control said head when a card is misfed or no card is in said machine irrespective of the position of said printing head.

4. In a machine of the class described, the combination of means for conveying cards, a numbering device, a sensing device, means for supporting said numbering device at any one of a plurality of positions with respect to the card path in said conveying means, and means controlling the operation of said numbering device in accordance with the indication of said sensing device without regard to the position of said numbering device.

5. In a machine of the class described, the combination of means for conveying cards, a numbering device, a sensing device, means for supporting said numbering device at any of a plurality of positions with respect to the card path in said conveying means comprising a notched cross bar and spring controlled manually releasable detent member, and means controlling the operation of said numbering device in accordance with the indication of said sensing device without regard to the position of said numbering device.

6. In a machine of the class described, the combination of means for conveying cards, a numbering device, a sensing device, means for supporting said numbering device at any one of a plurality of positions with respect to the card path in said conveying means comprising a notched cross bar and spring controlled manually releasable detent member, and means controlling the operation of said numbering device in accordance with the indication of said sensing device without regard to the position of said numbering device, comprising a floating cross bar, controlled by said sensing device, and a connecting member between said cross bar and said numbering device.

7. In a machine of the class described, the combination of a numbering head, a reciprocatable frame therefor, means in said frame for adjusting the position of said numbering head, a sensing means, and a connection between said sensing means, and said numbering head, adapted to disable said head, regardless of the position of adjustment thereof, in response to movement of said sensing means.

8. In a machine of the class described, the combination of means for conveying cards, a numbering device, a sensing device, means for supporting said numbering device at one of a plurality of positions with respect to the card path in said conveying means comprising a notched cross bar and spring controlled manually releasable detent member, means controlling the operation of said numbering device in accordance with the indication of said sensing device without regard to the position of said numbering device, and additional manually controlled means for controlling said numbering device without regard to the position thereof.

9. In a machine of the class described, the combination of means for conveying cards, a numbering device, a sensing device, means for supporting said numbering device at any one of a plurality of positions with respect to the card path in said conveying means, means controlling the operation of said numbering device in accordance with the indication of said sensing device without regard to the position of said numbering device, comprising a floating cross bar, controlled by said sensing device and a connecting member between said cross bar and said numbering device, and additional means for controlling said numbering device comprising a manually operable lever cooperating with said floating cross bar.

WILLIAM W. LASKER.